United States Patent [19]

Bell et al.

[11] E Re. 30,113

[45] Reissued Oct. 16, 1979

[54] WORKPIECE ELEVATOR

[75] Inventors: William F. Bell, Mt. Clemens; Walter H. Van Deberg, Berkley, both of Mich.

[73] Assignee: F. Jos. Lamb Company, Warren, Mich.

[21] Appl. No.: 772,347

[22] Filed: Feb. 28, 1977

Related U.S. Patent Documents

Reissue of:

[64] Patent No.: 3,938,649
Issued: Feb. 17, 1976
Appl. No.: 528,287
Filed: Nov. 29, 1974

[51] Int. Cl.[2] ..... B65G 47/34

[52] U.S. Cl. ..... 198/355; 198/358; 198/796

[58] Field of Search ..... 198/355, 370, 796, 356, 198/607, 358

[56] References Cited

U.S. PATENT DOCUMENTS

| | | | |
|---|---|---|---|
| 1,020,746 | 3/1912 | Dehler | 198/796 X |
| 1,302,631 | 5/1919 | Buck | 198/797 X |
| 1,426,379 | 8/1922 | Hadaway | 198/135 |
| 1,808,135 | 6/1931 | Gotthardt et al. | 198/355 |
| 1,832,000 | 11/1931 | Caesar et al. | 198/355 |
| 1,903,835 | 4/1933 | Olson | 198/38 X |
| 1,919,934 | 7/1933 | Donaldson | 198/355 X |
| 2,216,685 | 10/1940 | Caesar | 198/355 X |
| 2,427,057 | 9/1947 | Knox | 198/355 X |
| 2,790,567 | 4/1957 | Rockhill | 198/796 X |
| 3,463,298 | 8/1969 | Harrison | 198/155 |

*Primary Examiner*—Evon C. Blunk
*Assistant Examiner*—Douglas D. Watts
*Attorney, Agent, or Firm*—Barnes, Kisselle, Raisch & Choate

[57] ABSTRACT

A workpiece elevator is disclosed having a series of workpiece carriers thereon which move in an endless vertical path and from which workpieces are discharged by gravity. On each carrier there is mounted a latch mechanism which selectively blocks or opens the outlet end of each carrier. The elevator includes a plurality of outlet chutes for receiving workpieces from the carriers. Members are mounted on a stationary part of the elevator for selectively actuating the latch mechanism as the outlet of each carrier aligns with an outlet chute in accordance with the workpiece requirements of the outlet chute.

13 Claims, 15 Drawing Figures

FIG.14
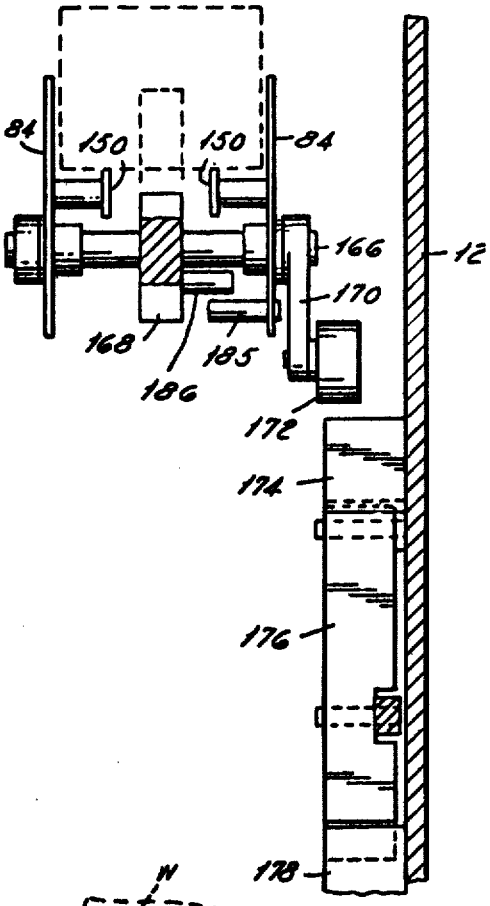
FIG.13
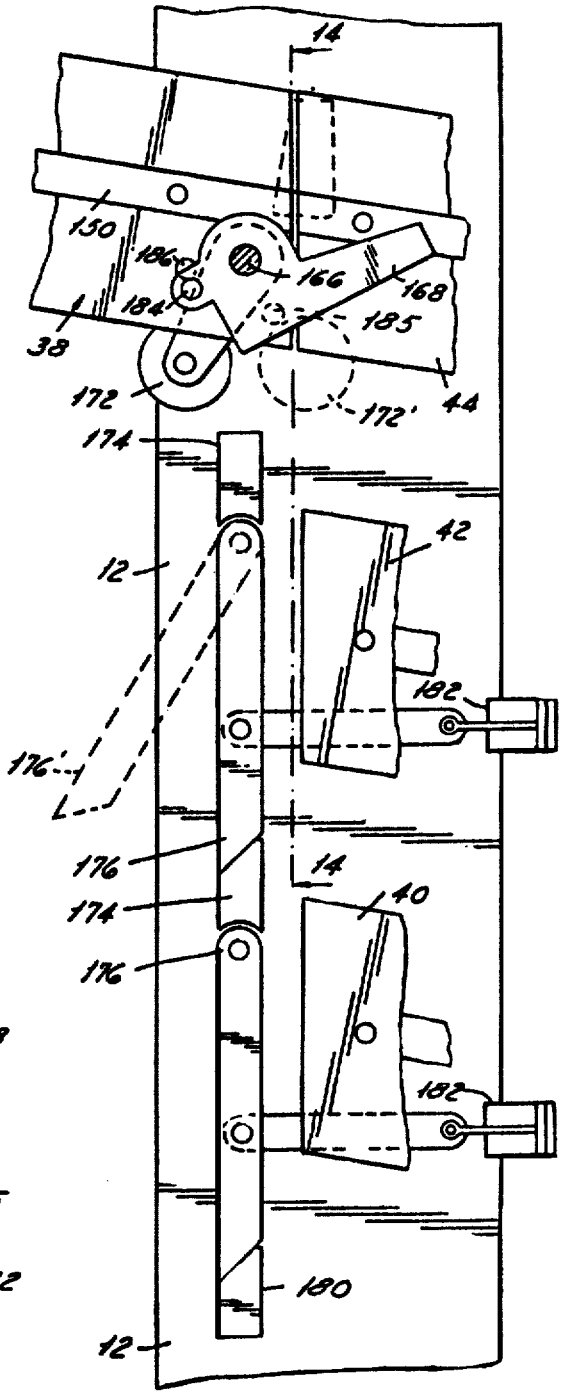
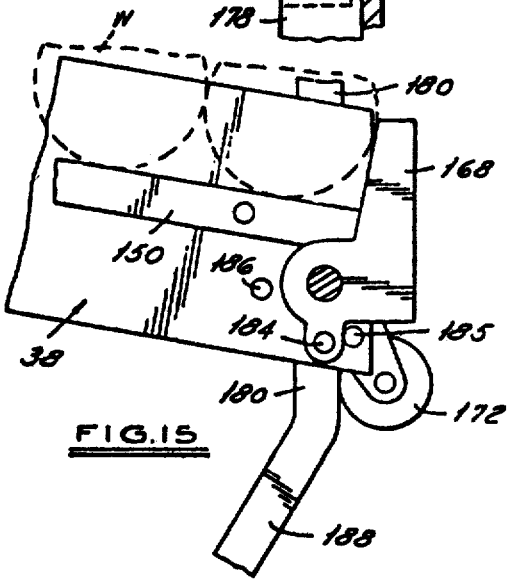
FIG.15

WORKPIECE ELEVATOR

Matter enclosed in heavy brackets [ ] appears in the original patent but forms no part of this reissue specification; matter printed in italics indicates the additions made by reissue.

This invention relates to workpiece elevators.

In automated machining and assembly operations workpieces are frequently transported from one location to another by conveyors in the form of gravity chuting. When these gravity conveyors are used it is necessary to raise the workpieces to an elevation above the height of their destination so that enough angular pitch will exist in the conveyor to insure that a line of parts at rest in the chuting will overcome friction when it is necessary for the parts to advance. From the standpoint of economy and space it is of course desirable to use as few workpiece elevators as possible to deliver workpieces to several destinations. One method of accomplishing this is to provide the elevator with a series of different outlets staggered vertically. When an elevator is equipped with several outlets it must have the ability to deliver sufficient quantities of workpieces to satisfy the demand for workpieces at each of the several destinations and must be able to selectively distribute the workpieces to any of the destinations on demand.

It is an object of this invention to provide a workpiece elevator having the ability to deliver large quantities of workpieces to several different destinations in accordance with the demand.

A further object of the present invention resides in the provision of a workpiece elevator having a series of workpiece carriers thereon and a mechanism for releasing the workpieces from the carriers in response to the vertical movement of the carriers.

An additional object of the invention resides in the provision of an elevator of the type described incorporating a mechanism for controlling the discharge of workpieces from the carriers which is of reliable and economical construction.

In the drawings

FIG. 1 is a diagrammatic view of a workpiece elevator embodying the present invention;

FIGS. 2 and 3 are sectional views along the lines 2—2 and 3—3, respectively, in FIG. 1;

FIGS. 4 and 5 are sectional views along the lines 4—4 and 5—5, respectively, in FIG. 3;

FIGS. 6 and 7 are sectional views along the lines 6—6 and 7—7, respectively, in FIG. 5;

FIG. 13 is a fragmentary sectional view of a further embodiment of workpiece elevator according to the present invention;

FIG. 14 is a sectional view along the line 14—14 in FIG. 13; and

FIG. 15 is a fragmentary sectional view of the lower end portion of the elevator mechanism illustrated in FIG. 13.

In the following description the term "workpieces" is used in a broad sense to cover not only individual workpieces themselves, but also partial or completed assemblies or articles carried in containers or on pallets. Likewise, the workpieces may have flat faces which ride on rollers or can have any suitable geometry (such as circular), in which case they are adapted to roll on flat surfaces. In other words, "workpieces" as used herein is intended to cover any form of article that is adapted to be conveyed in gravity chuting, whether by rolling on flat surfaces or riding on rollers.

Figure 1:
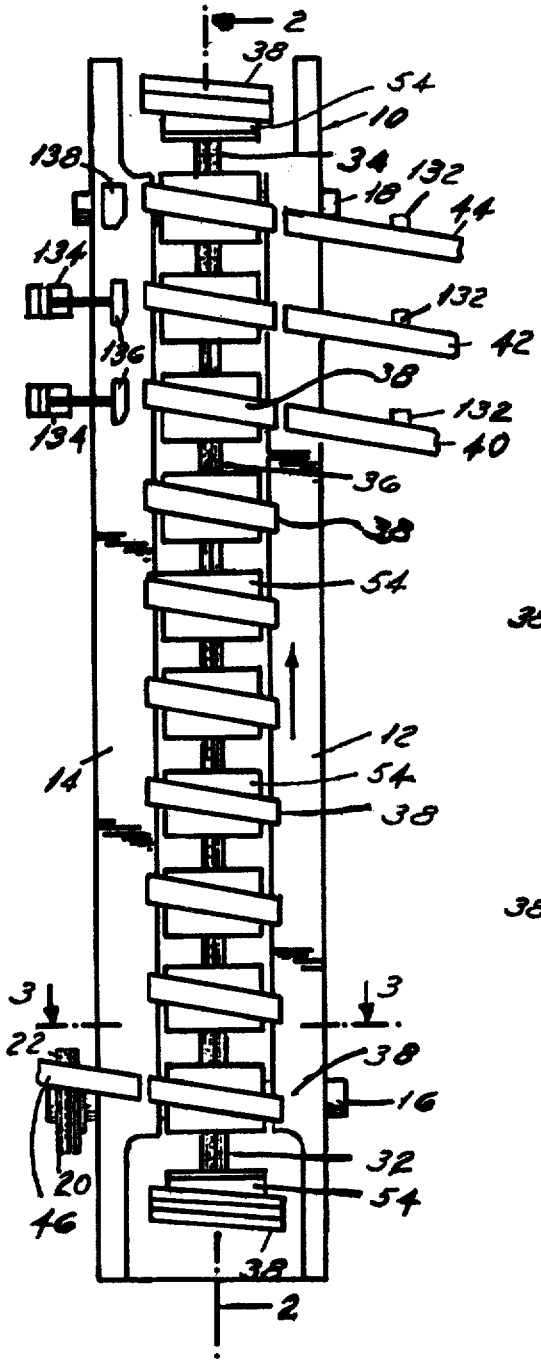
Figure 2:
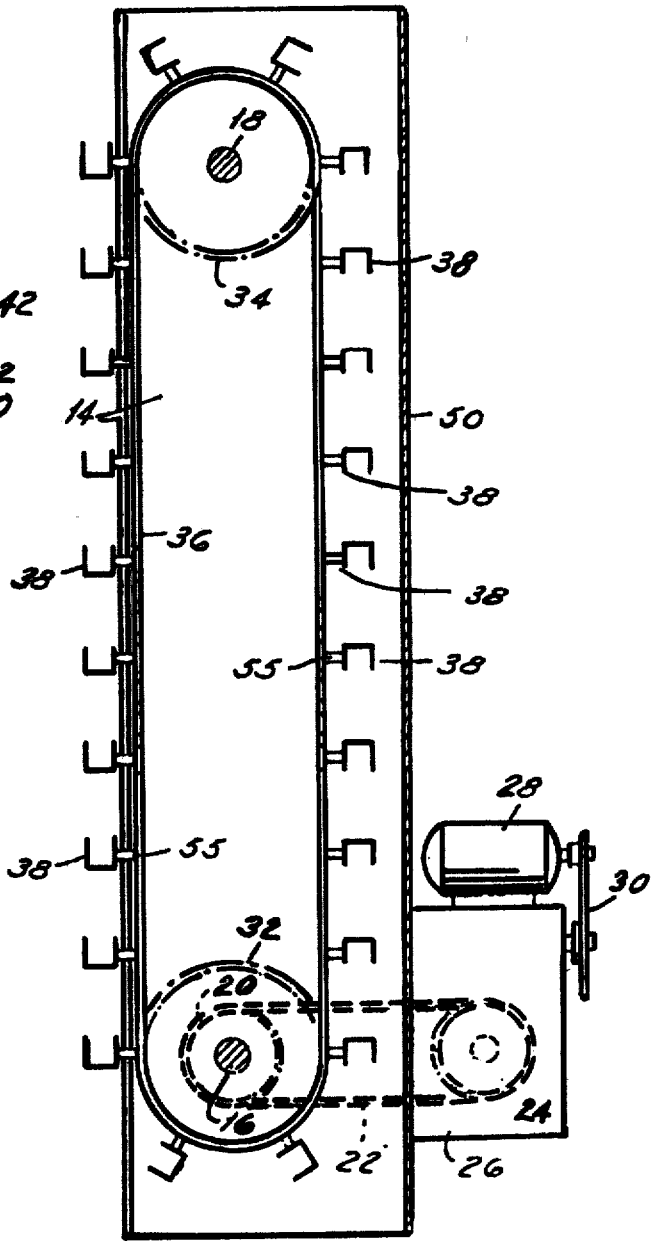

In the generally diagrammatic views of FIGS. 1 and 2 there is illustrated a workpiece elevator 10 having a supporting frame consisting of opposed U-shaped channels 12,14 interconnected in spaced relation. A drive shaft 16 is journalled adjacent the lower end of the elevator and an idler shaft 18 is journalled adjacent the upper end of the elevator. Drive shaft 16 is driven by a sprocket 20 by means of an endless chain 22 trained around an outlet sprocket 24 on an indexing mechanism 26 which receives its power from a motor 28 through a conventional pulley drive 30. A drive sprocket 32 is keyed to drive shaft 16 and an idler sprocket 34 is keyed to idler shaft 18. An endless chain 36 is trained around sprockets 32,34 and has carriers 38 fixedly mounted thereon at regularly spaced intervals. Carriers 38 are adapted to receive and retain a plurality of workpieces W. In FIG. 1 carriers 38 are shown in the dwell condition of the elevator between indexes of travel. It will be noted that carriers 38 are inclined to the horizontal so that in effect each provides a short section of gravity chuting with an inlet at its higher end and an outlet as its lower end. In the position shown in FIG. 1 the upper three containers have their outlets aligned with the inlet ends of outlet chutes 40,42,44. At the lower end of the elevator a carrier 38 has its inlet aligned with the outlet end of an inlet chute 46. The index mechanism 26 is adapted to intermittently rotate sprocket 32 so that each of the carriers 38 has an increment of travel equal to the pitch of the vertical spacing of the carriers on chain 36. Between each indexing movement of the chain there is a dwell period of sufficient time to allow the workpieces W to be loaded into or discharged from carriers 38.

Figure 3:
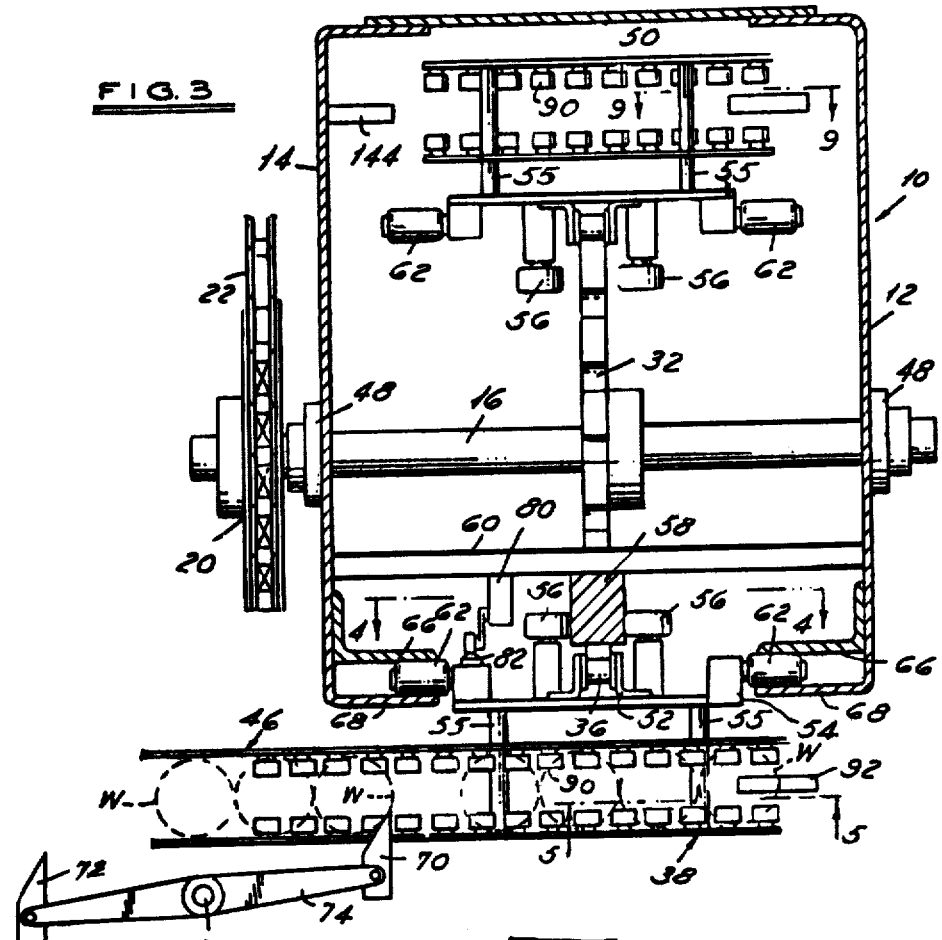
Figure 4:
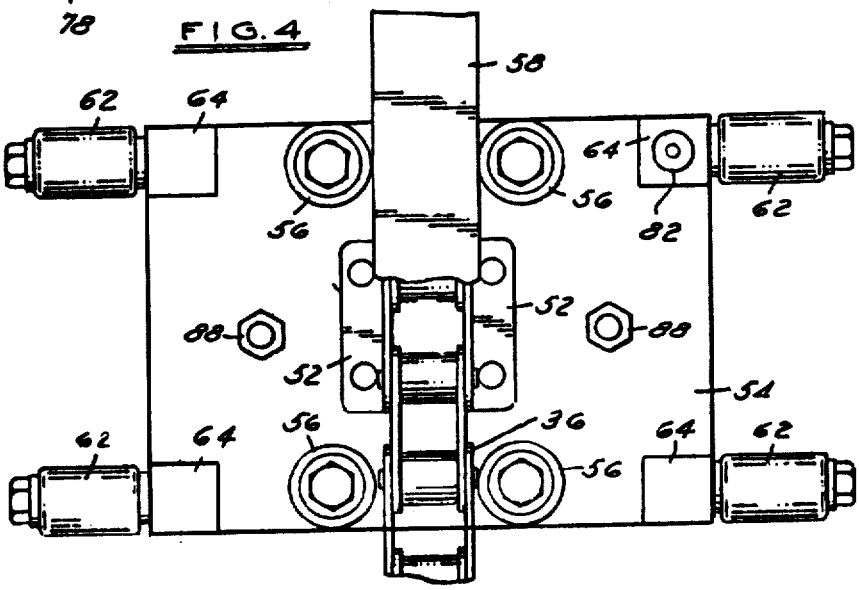

Referring now to FIGS. 3 and 4 wherein the elevator and carrier structure are shown in greater detail, it will be observed that shaft 16 to which sprockets 32,20 are keyed is journalled in bearing blocks 48 that are mounted on side channels 12,14. The side channels are connected together by a series of end straps, one of which is shown at 50. Chain 36 has a plurality of mounting links 52 thereon to which carrier plates 54 are suitably attached. Carriers 38 are mounted on plates 54 on the outer side of the elevator by means of spacers 55. Each carrier plate is guided in one plane as it travels upwardly by two pair of rollers 56 on the carrier plate which engage the opposite sides of a stabilizing bar 58 which runs vertically substantially the full height of the elevator between sprockets 32,34. Stabilizing bar 58 is supported by a series of cross members at the work-carrying side of the elevator, one of said cross members being designated 60. Carrier plate 54 is stabilized in a second plane by two pair of rollers 62. Rollers 62 are mounted at the four corners of carrier plate 54 by blocks 64. These bearing rollers 62 stabilize carrier plate 54 in a plane parallel to the axes of shafts 16,18 by their engagement in channels on opposite sides thereof formed by angle members 66 and the inwardly turned flanges 68 of the side channels 12,14. Thus, as the chain 36 travels its endless path around sprockets 32,34 the carriers 38 are stabilized in two directions for smooth running and accurate positioning.

It will be understood that stabilizing of the carriers is required only on the front side of the elevator, that is, when the carriers are in an upright parts-carrying position. Stabilization of the carriers is not required when they are travelling downwardly at the rear side of the elevator where the descending carriers assume an inverted position. As the carriers travel around the lower sprocket 32 they can be in a relatively unstable condition, determined only by chain 36. However, as the carriers swing upwardly and approach the horizontal center of sprocket 32 the two top rollers 62 on each carrier plate 54 engage the flanges 68 of the side channels 12, 14 and are thus properly aligned for engagement with the angles 66. At the same time the upper rollers 56 on carrier plate 54 engage the tapered lower end of stabilizing bar 58 so that the carrier plate will be positively guided for its full length of upward travel between the sprockets.

In FIG. 3 one of the carrier assemblies 38 is shown in alignment with the inlet chute 46 which contains a continuous line of workpieces W retained by an escapement dog 70. Carrier 38 is shown retaining a complement of four workpieces W which have been metered from the inlet chute 46 by the action of the escapement mechanism which consists of dogs 70 and 72 mounted at opposite ends of a lever 74. The escapement mechanism is actuated by a cylinder 76 which oscillates the lever about its pivot pin 78, thus allowing the leading four workpieces in chute 46 to roll by gravity into carrier 38 while restraining forward movement of the remaining upstream workpieces. Cylinder 76 is actuated in response to circuitry which receives a signal from a switch 80 on the elevator structure. Switch 80 is actuated by a cam button 82 mounted on one of the upper blocks 64 which support rollers 62. Thus the escapement mechanism operates to discharge four workpieces into each carrier 38 as the carrier reaches a dwell position in alignment with chute 46.

Figure 5:
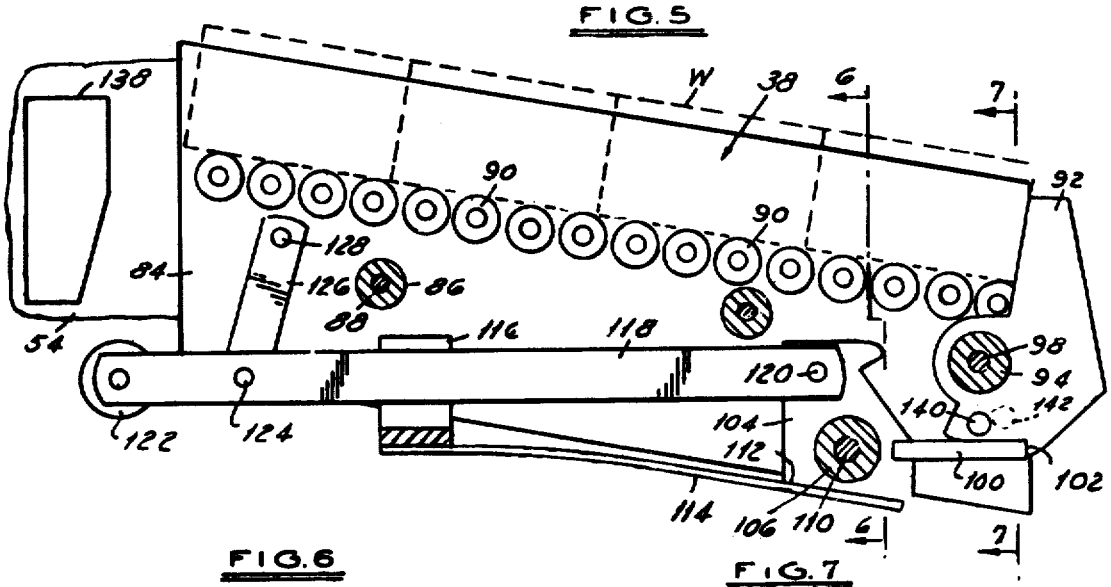
Figure 6:
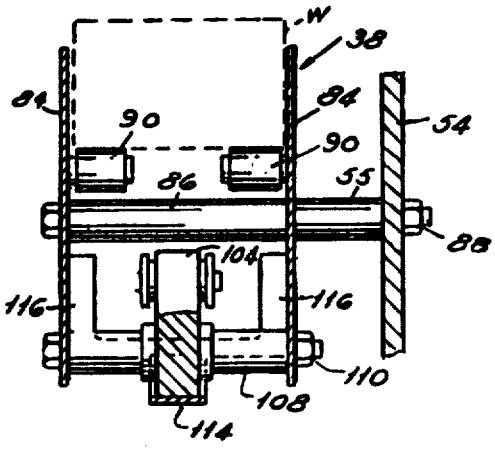
Figure 7:
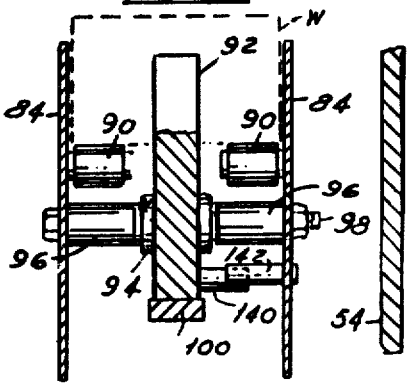

As shown in FIGS. 5 through 7, each carrier 38 consists of a pair of side plates 84 separated by tubular spacers 86. A through bolt and nut 88 extends through spacers 86,55 to support the carriers on plates 54. On the inner side of each side plate 84 there is mounted a series of workpiece support rollers 90. The rollers 90 are aligned on an incline so that the workpieces W will tend to gravitate to the outlet end of the carrier.

At the outlet end of each carrier there is pivotably supported a lever 92 for controlling the discharge of workpieces from the carrier. Lever 92 is pivotably supported on a bearing 94 and is spaced between side plates 84 by spacers 96 which are secured in place by a bolt and nut 98. In the position shown in FIG. 5 control lever 92 is retained in a position blocking the outlet of carrier 38 by means of a sear 100 which interengages a shoulder 102 on lever 92. Sear 100 is mounted on a sear lever 104 which is pivotally supported in a bearing 106 retained between side plates 84 by means of spacers 108 and a through bolt and nut 110. Sear lever 104 has a flat face 112 which is normally engaged by the distal end of a leaf spring 114 to retain the sear in a position locking control lever 92 in the outlet blocking position. Spring 114 has its other end mounted on a U-shaped bracket 116 extending between side plates 84. Spring 114 renders sear lever 104 angularly stable in the position illustrated in FIG. 5.

A pair of parallel release links 118 are pivoted at one end, as at 120, to sear lever 104. Between the opposite ends of links 118 there is mounted a cam follower 122. Intermediate their ends links 118 are supported through a pin 124 and a link 126 which is in turn pivotally supported on side plates 84 by a pin 128. It will be observed that all of the parts illustrated in FIG. 5 for retaining lever 92 in its outlet blocking position are constructed and arranged so that all of the forces exerted thereby are contained within the work carrier 38.

Figure 8:
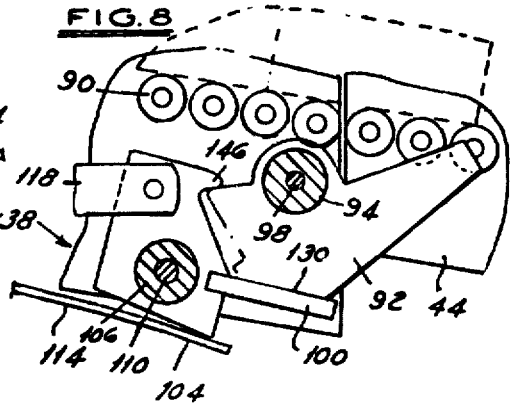
FIG. 8 is a fragmentary sectional view of a portion of the arrangement shown in FIG. 5 illustrating the manner in which a workpiece is released from a carrier on the elevator.

When cam follower 122 is caused to be shifted to the right as viewed in FIG. 5, links 118 will rotate sear lever 104 in a clockwise direction, thus swinging sear 100 out of engagement with shoulder 102 on control lever 92. It will also be observed that lever 92 has a configuration such that it is unbalanced with respect to its pivot axis at bearing 94. Consequently, when sear 100 disengages lever 92, lever 92 pivots clockwise under the influence of gravity to the position shown in FIG. 8 where sear 100 now engages the relatively flat surface 130 of control lever 92. In this position the upper end of control lever 92 clears the outlet of carrier 38 and permits the workpieces W therein to roll by gravity into one of the outlet chutes, such as chute 44. When sear lever 104 is rotated by links 118 to the position shown in FIG. 8 spring 114 is further deflected and urges sear lever 104 in a counterclockwise direction. However, sear 100 engages the flat face 130 of control lever 92 which is thereby restrained from returning to its normal upright position shown in FIG. 5. Thus, a bi-stable condition of lever 92 is created.

Each of the outlet chutes is preferably provided with a high level switch 132 which is actuated when the workpieces in the outlet chutes reach a predetermined level. Switches 132 of outlet chutes 40,42, when tripped, are adapted to actuate cylinders 134 on the elevator structure which control cams 136. Cams 136 are positioned on channel 14 such that, when they are projected by cylinders 134, they are engaged by cam followers 122 when the outlet of a carrier 38 is aligned with an outlet chute. The uppermost outlet chute 44 has associated therewith a stationary cam 138 which is engaged by each cam follower 122 as its associated carrier aligns with the top outlet chute 44.

Thus it is apparent that the above described unloading of the workpieces from the carriers will occur whenever either of cylinders 134 are actuated to project cams 136 into the path of travel of cam followers 122 and a carrier is in a dwell position aligned with outlet chutes 40,42. Likewise, in the arrangement illustrated, when a carrier 38 reaches a dwell position in alignment with the top outlet chute 44, its associated cam follower 122 will be engaged by stationary cam 138 to likewise permit unloading of the carrier. If a high level switch 132 is provided on the uppermost outlet chute 44, this switch, when actuated, will operate to de-energize motor 28. If desired, the high level switch on outlet chute 44 can be omitted, in which case chute 44 will extend down to inlet chute 46 and be connected therewith with a suitable workpiece-blending device so that the elevator motor can operate continously.

Figure 9:
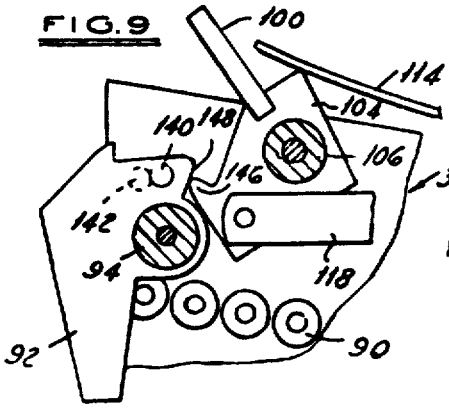
FIG. 9 is a sectional view along the line 9—9 in FIG. 3 showing the release mechanism for the elevator carrier in the inverted position it assumes when it is descending at the rear side of the elevator.

In FIG. 9 a portion of carrier 38 and a latch mechanism thereon is shown in the inverted position which it assumes when the carrier is travelling downwardly at the rear side of the elevator. When the carrier is in the inverted position the center of gravity of control lever 92 is located far enough from the pivot axis at the bearing 94 to effectively re-position the lever so that sear 100 can return to its locking position. In order to prevent lever 92 from rotating further than required when the carrier is inverted, a stop pin 140 on lever 92 is adapted to abut a pin 142 mounted on one of the side plates 84. However, it will be realized that lever 92 will pivot to the position shown in FIG. 9 under the influence of gravity only if the mechanism is clean and free to function in this manner. During the course of its life operating in contaminated conditions it is conceivable that bearing 106 will not rotate freely and, therefore, gravity would not exert enough force to effect resetting of lever 92 in the manner described. To insure against a malfunction for this reason a fixedly positioned cam 144 is located on the inside of side channel 14 near the lower end thereof. Cam 144 is adapted to be engaged by the successive cam followers 122 when the carriers are in the inverted position. The lateral projection of cam 144 is greater than cams 136,138 so that when a cam follower 122 engages cam 144 links 118 are shifted to a greater extent than is the case when cam followers 122 engage cams 136,138. Each lever 104 has a hook 146 which is adapted to engage a face 148 on lever 92 when links 118 are actuated by cam 144 to pivot lever 92 to a position slightly beyond its normal working position and thereby allow sear 100 to be freely returned to its locking position with the shoulder 102 of lever 92. The sear returns to this locking position under the bias of spring 114 after cam follower 122 has passed beyond cam 144. Thus cam 144 in combination with hook 146 and face 148 insure that lever 92 will be reset to its outlet blocking position while the carrier is travelling in a downward direction and before it reaches inlet chute 146.

Figure 11:
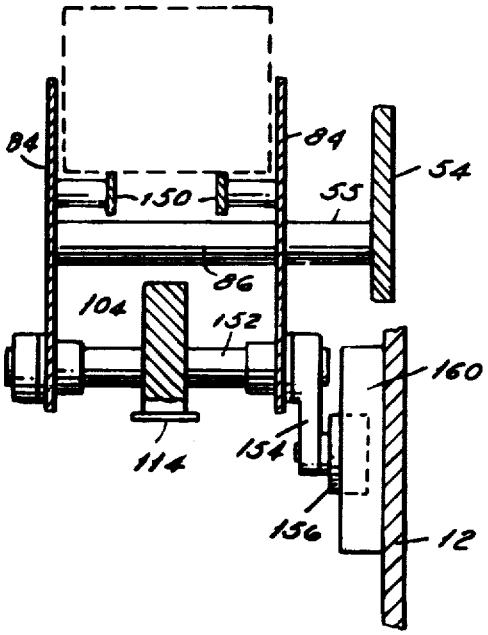
FIG. 11 is a sectional view along the line 11—11 in FIG. 10.
Figure 10:
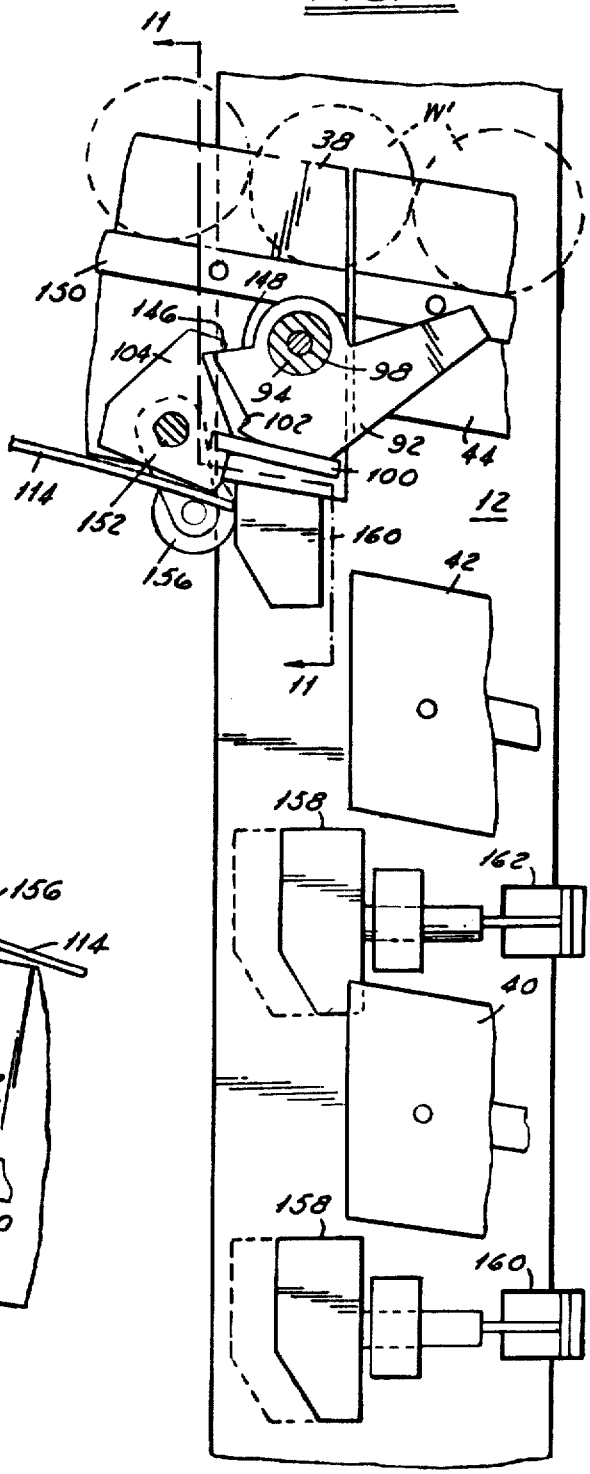
FIG. 10 is a fragmentary sectional view of a second embodiment of workpiece elevator according to the present invention.
Figure 12:
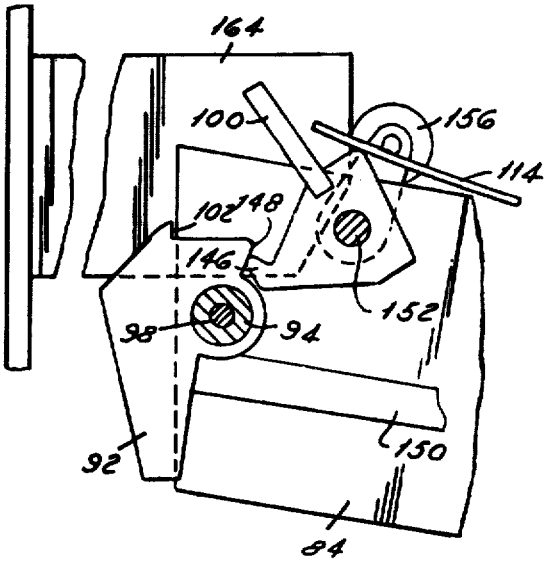
FIG. 12 is a fragmentary sectional view of the release mechanism illustrated in FIG. 10 as it descends at the rear side of the elevator in an inverted position.

The embodiment illustrated in FIGS. 10 through 12 involves a construction where the releasing cams and actuating cylinders are located at the same side of the elevator as the outlet chutes. This arrangement may be required in some cases for the purpose of accessibility or other reasons, including structural or design preferences. In the arrangement illustrated in FIGS. 10 through 12 the workpieces W' are cylindrical in shape and are adapted to roll on rails 150 which are mounted on the side plates 84 of the carrier. In this arrangement the configuration of the control lever 92 and the sear lever 104 is the same as in the embodiment previously described. However, shaft 154 to which sear lever 104 is keyed extends through the side plate 84 adjacent carrier plate 54 and has an arm 154 keyed thereto. Arm 154 carries a cam follower 156 at the free end thereof that is arranged to cooperate with cams 158 and 160 which correspond in function with cams 136,138, respectively, described in the previous embodiment.

The function of this mechanism is substantially the same as the latch arrangement previously described. If workpieces are required at either outlet chute 40 or 42, the corresponding cam 158 will be actuated by its respective cylinder 162 to project the cams into the path of travel of cam follower 156. Then, when a carrier is aligned with either of these chutes, the latch mechanism will be triggered in the manner previously described to allow workpieces W' in the carrier to roll into the proper chute. Cam 160, like cam 138 previously described, is permanently fixed to one of the side channels so that it will actuate the latch mechanism in all cases, if the cams previously passed have not done so.

In FIG. 12 the latch mechanism is shown in the inverted position to correspond with its orientation when the carrier is descending at the rear side of the elevator. A cam 164 is provided which corresponds in function with cam 144 of the previous embodiment described to positively reset control lever 92 to a position where sear 100 can be readily returned to its locking position against shoulder 102 under the bias of spring 114.

Referring now to FIGS. 13 through 15, the invention is illustrated in connection with an arrangement wherein the workpieces in the carrier exert forces on the retaining lever of a relatively small magnitude, these forces being imposed upon a cam structure mounted on the elevator support itself. In this arrangement adjacent the outlet end of each carrier there is keyed to a shaft 166 a control lever 168. Shaft 166 extends through the side plates 84 of the carrier and the end of shaft 166 adjacent the side channel 12 has keyed thereto a lever 170 on which is journalled a cam follower 172. Side channel 12 has a segmented cam track mounted thereon consisting of an upper cam 176, a pair of cam gates 176 separated by a cam segment 178, and a continuous cam 180. Cam gates 176 are located adjacent outlet chutes 40,42 and the upper cam 174 is located slightly below the uppermost outlet chute 44.

Cam gates 176 are adapted to be swung to the broken line position 176' by cylinders 182. Cylinders 182 are adapted to be actuated by the high level switches 132 associated with the respective chutes. When the quantity of workpieces in chutes 40 or 42 have reached a predetermined level the respective cylinder 182 is actuated to swing cam gates 176 from the broken to the solid line position. Thus, when chutes 40,42 are capable of receiving additional workpieces cam gates 176 are in the broken line position.

When the cam gates 176 are in the solid line position and a carrier travels upwardly past the outlet chutes, cam follower 172 will be retained in the broken line position 172' shown in FIG. 14 and thus retain control lever 168 in the broken line position blocking the outlet of the carrier. However, when the carrier is aligned with outlet chute 44 cam follower 172 rolls out of engagement with the upper cam 174 and the force of gravity will cause control lever 168 to pivot to the solid line position shown in FIG. 13. This permits the workpieces to roll into chute 44. On the other hand, if outlet chute 42 requires workpieces the associated gate 176 will be in the position shown in broken lines at 176'. Accordingly, as cam follower 172 rides upwardly out of engagement with cam segment 178, control lever 168 is permitted to swing clockwise and thereby permit the workpieces to roll from the carrier into outlet chute 42. In the arrangement illustrated, upon the next indexing cycle of the elevator cam follower 172 will move upwardly, engage the inclined face of the open gate 176, and, thus, return lever 168 to the outlet blocking position. However, when cam follower 172 rides off the upper cam 174 control lever 168 will again swing to the open position illustrated in solid lines in FIG. 13. If desired, the electrical circuitry can be designed to return gates 176 to the closed position after each dwell cycle of the elevator. Stop pins 184,185,186 are provided for limiting pivotal movement of lever 168 in opposite directions.

Referring now to FIG. 15 which shows a carrier 38 at the lower end of the elevator just before it reaches inlet chute 46, it will be observed that the lower end of the continuous cam track 180 has an inwardly inclined portion 188 which is engaged by cam follower 172 to swing lever 168 from a position clearing the outlet of the carrier to a position blocking the outlet of the carrier. This arrangement is desirable because, as illustrated, the configuration of lever 168 and lever 170 is such that, unless lever 168 is positively retained in the outlet blocking position, it will gravitate to the position illustrated in solid lines in FIG. 13 when the carrier is travelling upwardly. Thus, the inwardly inclined portion 188 of cam 180 closes the outlet end of the carrier before it reaches the inlet chute 46.

We claim:

[1. In a workpiece elevator the combination of a vertically extending support, endless chain means mounted on said support to travel in an endless path lying in a generally vertical plane, a plurality of workpiece carriers mounted on said chain means at regularly spaced intervals, said carriers having a workpiece supporting surface inclined to the horizontal and having an inlet at the upper end and an outlet at the lower end of said supporting surface, a workpiece inlet chute adjacent the lower end of the support and a series of regularly spaced outlet chutes adjacent the upper end of the support, means for driving said chain means in said endless path with an intermittent motion so that the inlets of successive carriers are periodically aligned with said inlet chute to receive workpieces therefrom and the outlets of the successive carriers are periodically aligned with the successive outlet chutes, workpiece control means mounted on each carrier adjacent the outlet thereof, said control means being movable from a first position blocking said outlet to prevent discharge of workpieces from the carrier to a second position clearing said outlet to permit workpieces to be discharged from the carrier by gravity, retaining means for releasably locking said control means in said first position as the carriers travel between the successive outlet chutes, and release means on said support associated with each outlet chute for actuating said retaining means as the carrier moves into alignment with an outlet chute to unlock said control means and cause the same to assume said second position clearing said outlet.]

[2. The combination set forth in claim 1 wherein at least some of said release means are movable to and from a position in which they are inoperative to actuate said retaining means.]

[3. The combination set forth in claim 2 including means in said chutes responsive to the quantity of workpieces therein for moving said release means to and from said inoperative position.]

[4. The combination set forth in claim 2 wherein the release means associated with the last of the series of outlet chutes is fixedly positioned on the support to actuate the retaining means of each carrier as its outlet moves into alignment with the last-mentioned outlet chute.]

[5. The combination set forth in claim 1 wherein said control means comprises a lever supported on each carrier for pivotal movement about a horizontal axis, said lever being unbalanced relative to its pivot axis so that it is adapted to gravitate to said second position when the lever is released by said retaining means.]

[6. The combination set forth in claim 5 wherein the path of travel of the chain means is such that the carriers are in an upright workpiece retaining position when travelling upwardly and are inverted when travelling downwardly, said levers being adapted to gravitate to said first position when the carriers are inverted.]

7. The combination set forth in claim [6] *18* including additional means on said support engageable by the retaining means on each carrier for releasably locking the lever in said first position after the associated carrier is inverted and before it reaches a position in alignment with said inlet chute.

[8. The combination set forth in claim 1 wherein said retaining means includes an abutment movably mounted on each carrier and said release means comprises a plurality of cams on said support associated one with each of said outlet chutes, said cams lying in the path of travel of said abutment and adapted to move the abutment when the carrier travels past the cam, said abutment when moved by said cam being operative to release said control means.]

9. The combination set forth in claim [8] *19* wherein at least some of said cams are movable to and from an inoperative position relative to the path of travel of said abutments.

10. The combination set forth in claim 9 including means in the outlet chutes operatively associated with the movable cams for moving the cams to said inoperative position when the quantities of workpieces in said chutes reach a predetermined level.

[11. The combination set forth in claim 1 wherein said control means comprises a lever pivotally supported on each carrier, said retaining means comprising a latch mechanism on each carrier, said latch mechanism including a pivotally supported lever engageable with said control lever to releasably lock the latter in said blocking position and spring means biasing said latch lever to its locking position.]

12. The combination set forth in claim [11] *20* wherein said latch mechanism also includes means adapted to be actuated by said release means to pivot the latch lever against the bias of said spring means to a position releasing the control lever.

13. The combination set forth in claim 12 wherein said spring means acts on the latch lever to yieldably retain the latter in both its locking and releasing positions.

14. The combination set forth in claim 12 wherein said control lever is unbalanced relative to its pivot axis so that it tends to gravitate to said second position clearing the outlet of the carrier, said control and latch levers having a first pair of abutments thereon which, when interengaged, lock the control lever in said first position, said control and latch levers having a second pair of abutments thereon which are adapted to interengage when the latch lever is rotated to its releasing position and the control lever gravitates to said second position and additional means on said support for rotating the latch lever when the latter is in the releasing position to interengage said second pair of abutments and rock said control lever back to said first position.

15. The combination set forth in claim 14 wherein said last-mentioned means are located on said support in the path of travel of the endless chain means at a point intermediate the last [of the series of] outlet [chutes] *chute* and said inlet chute.

16. The combination set forth in claim 14 wherein the path of travel of the chain means is such that each carrier assumes an upright workpiece retaining position as the carriers are travelling upwardly and an inverted position when they are travelling downwardly, said release means being located on the support to actuate the latch levers from their locking to their released position when the carriers are moving upwardly, said additional means being located on the support to rotate said latch levers when the carriers are travelling downwardly.

*17. In a workpiece elevator the combination of a vertically extending support, endless chain means mounted on said support to travel in an endless path lying in a generally vertical plane, a plurality of workpiece carriers mounted on said chain means at regularly spaced intervals, said carriers having a workpiece supporting surface inclined to the horizontal and having an inlet at the upper end and an outlet at the lower end of said supporting surface, a workpiece inlet chute adjacent the lower end of the support and a series of regularly spaced outlet chutes adjacent the upper end of said support, the spacing of said outlet chutes corresponding to the spacing of the carriers on the endless chain means, means for driving said chain means in said endless path with an intermittent motion so that the inlets of successive carriers are periodically aligned with said inlet chute to receive workpieces therefrom and the outlets of the successive carriers are periodically aligned with the successive outlet chutes, workpiece control means mounted on each carrier adjacent the outlet thereof, said control means being movable from a first position blocking said outlet to prevent discharge of workpieces from the carrier to a second position clearing said outlet to permit workpieces to be discharged from the carrier by gravity, retaining means for releasably locking said control means in said first position as the carriers travel between the successive inlet and outlet chutes, release means on said support associated with each outlet chute for actuating said retaining means as the carrier moves into alignment with an outlet chute to unlock said control means and cause the same to assume said second position clearing said outlet, at least some of said release means being movable to and from a position in which they are inoperative to actuate said retaining means and including means in said chutes responsive to the quantity of workpieces therein for moving said release means to and from said inoperative position.*

*18. In a workpiece elevator the combination of a vertically extending support, endless chain means mounted on said support to travel in an endless path lying in a generally vertical plane, a plurality of workpiece carriers mounted on said chain means at regularly spaced intervals, said carriers having a workpiece supporting surface inclined to the horizontal and having an inlet at the upper end and an outlet at the lower end of said supporting surface, a workpiece inlet chute adjacent the lower end of the support and a series of regularly spaced outlet chutes adjacent the upper end of said support, the spacing of said outlet chutes corresponding to the spacing of the carriers on the endless chain means, means for driving said chain means in said endless path with an intermittent motion so that the inlets of successive carriers are periodically aligned with said inlet chute to receive workpieces therefrom and the outlets of the successive carriers are periodically aligned with the successive outlet chutes, workpiece control means mounted on each carrier adjacent the outlet thereof, said control means being movable from a first position blocking said outlet to prevent discharge of workpieces from the carrier to a second position clearing said outlet to permit workpieces to be discharged from the carrier by gravity, retaining means for releasably locking said control means in said first position as the carriers travel between the successive inlet and outlet chutes, release means on said support associated with each outlet chute for actuating said retaining means as the carrier moves into alignment with an outlet chute to unlock said control means and cause the same to assume said second position clearing said outlet.*

*19. In a workpiece elevator the combination of a vertically extending support, endless chain means mounted on said support to travel in an endless path lying in a generally vertical plane, a plurality of workpiece carriers mounted on said chain means at regularly spaced intervals, said carriers having a workpiece supporting surface inclined to the horizontal and having an inlet at the upper end and an outlet at the lower end of said supporting surface, a workpiece inlet chute adjacent the lower end of the support and a series of regularly spaced outlet chutes adjacent the upper end of said support, the spacing of said outlet chutes corresponding to the spacing of the carriers on the endless chain means, means for driving said chain means in said endless path with an intermittent motion so that the inlets of successive carriers are periodically aligned with said inlet chute to receive workpieces therefrom and the outlets of the successive carriers are periodically aligned with the successive outlet chutes, workpiece control means mounted on each carrier adjacent the outlet thereof, said control means being movable from a first position blocking said outlet to prevent discharge of workpieces from the carrier to a second position clearing said outlet to permit workpieces to be discharged from the carrier by gravity, retaining means for releasably locking said control means in said first position as the carriers travel between the successive inlet and outlet chutes, release means on said support associated with each outlet chute for actuating said retaining means as the carrier moves into alignment with an outlet chute to unlock said control means and cause the same to assume said second position clearing said outlet, said retaining means including an abutment movably mounted on each carrier and said release means comprises a plurality of cams on said support associated one with each of said outlet chutes, said cams lying in the path of travel of said abutment and adapted to move the abutment when the carrier travels past the cam, said abutment when moved by said cam being operative to release said control means.*

*20. In a workpiece elevator the combination of a vertically extending support, endless chain means mounted on said support to travel in an endless path lying in a generally vertical plane, a plurality of workpiece carriers mounted on said chain means at regularly spaced intervals, said carriers having a workpiece supporting surface inclined to the horizontal and having an inlet at the upper end and an outlet at the lower end of said supporting surface, a workpiece inlet chute adjacent the lower end of the support and at least one outlet chute adjacent the upper end of the support, means for driving said chain means in said endless path with an intermittent motion so that the inlets of successive carriers are periodically aligned with said inlet chute to receive workpieces therefrom and the outlets of the succesive carriers are periodically aligned with the outlet chute, workpiece control means mounted on each carrier adjacent the outlet thereof, said control means being movable from a first position blocking said outlet to prevent discharge of workpieces from the carrier to a second position clearing said outlet to permit workpieces to be discharged from the carrier by gravity, retaining means for releasably locking said control means in said first position as the carriers travel between the inlet and outlet chutes,*

*and release means on said support associated with the outlet chute for actuating said retaining means as the carrier moves into alignment with the outlet chute to unlock said control means and cause the same to assume said second position clearing said outlet, said control means comprising a lever pivotally supported on each carrier, said retaining means comprising a latch mechanism on each carrier, said latch mechanism including a pivotally supported lever engageable with said control lever to releasably lock the latter in said blocking position and spring means biasing said latch lever to its locking position.*

*21. In a workpiece elevator the combination of a vertically extending support, endless chain means mounted on said support to travel in an endless path lying in a generally vertical plane, a plurality of workpiece carriers mounted on said chain means at regularly spaced intervals, said carriers having a workpiece supporting surface inclined to the horizontal and having an inlet at the upper end and an outlet at the lower end of said supporting surface, a workpiece inlet chute adjacent the lower end of the support and at least one outlet chute adjacent the upper end of the support, means for driving said chain means in said endless path with an intermittent motion so that the inlets of successive carriers are periodically aligned with said inlet chute to receive workpieces therefrom and the outlets of the successive carriers are periodically aligned with the outlet chute, workpiece control means mounted on each carrier adjacent the outlet thereof, said control means being movable from a first position blocking said outlet to prevent discharge of workpieces from the carrier to a second position clearing said outlet to permit workpieces to be discharged from the carrier by gravity, retaining means for releasably locking said control means in said first position as the carriers travel between the inlet and outlet chutes, and release means on said support associated with the outlet chute for actuating said retaining means as the carrier moves into alignment with the outlet chute to unlock said control means and cause the same to assume said second position clearing said outlet, said retaining means including an abutment movably mounted on each carrier and said release means comprising a cam on said support associated with said outlet chute, said cam lying in the path of travel of said abutment and adapted to move the abutment when the carrier travels past the cam, said abutment when moved by said cam being operative to release said control means.*

* * * * *